(No Model.)
E. L. JONES.
CLUTCH.
No. 520,528. Patented May 29, 1894.
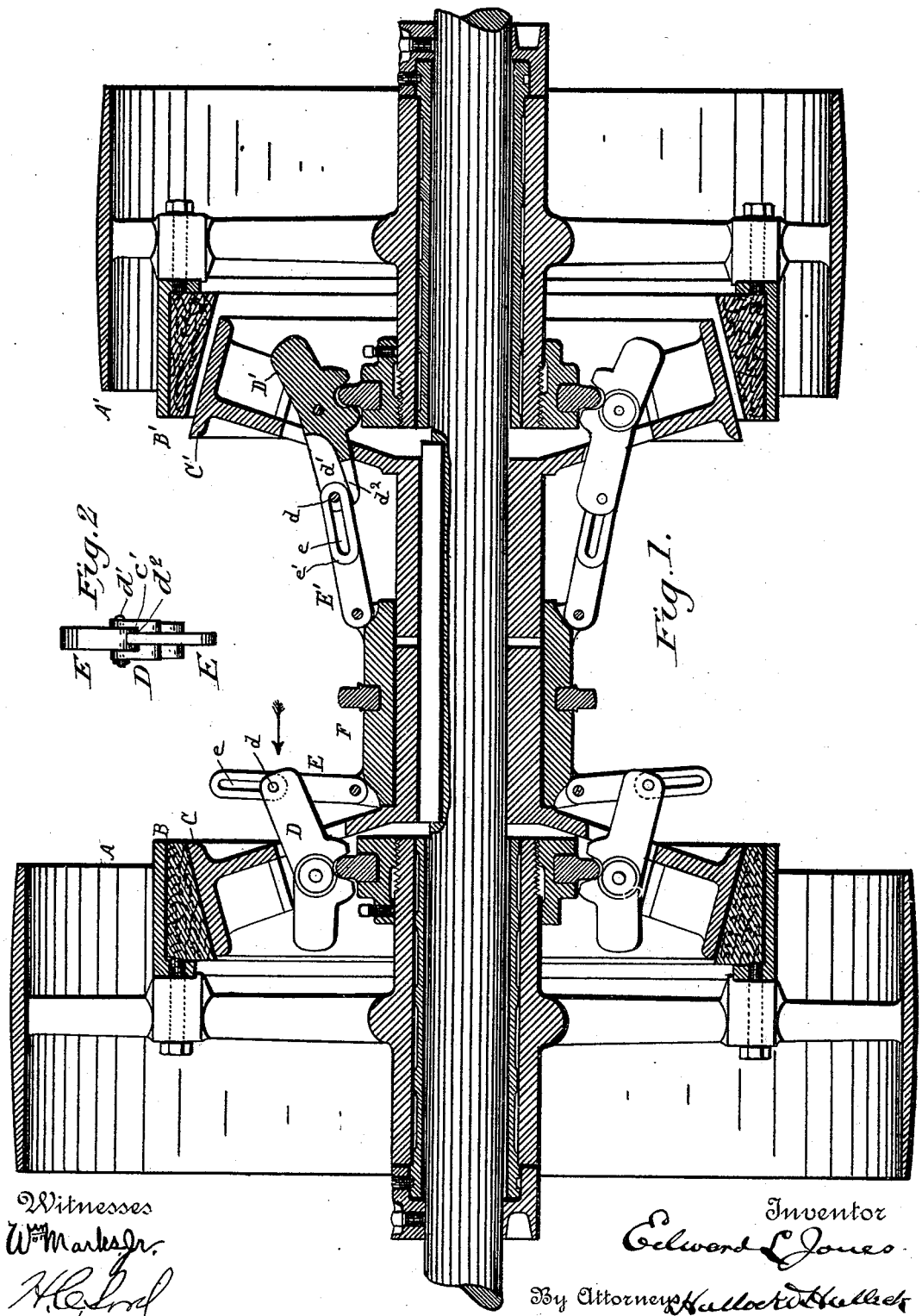
Witnesses
Wm Marks Jr.
H. C. Ford
Inventor
Edward L. Jones
By Attorneys Hallock & Hallock

UNITED STATES PATENT OFFICE.

EDWARD L. JONES, OF WESTFIELD, NEW YORK, ASSIGNOR TO THE CROWELL CLUTCH AND PULLEY COMPANY, OF SAME PLACE.

CLUTCH.

SPECIFICATION forming part of Letters Patent No. 520,528, dated May 29, 1894.

Application filed August 31, 1893. Serial No. 484,435. (No model.)

*To all whom it may concern:*

Be it known that I, EDWARD L. JONES, a citizen of the United States, residing at Westfield, in the county of Chautauqua and State of New York, have invented certain new and useful Improvements in Coupling Mechanism for Friction-Clutches; and I do hereby declare the following to be a full, clear, and exact description of the invention, such as will enable others skilled in the art to which it appertains to make and use the same.

This invention relates to friction clutches, and particularly to such clutches when used in pairs, as in reversing gearing for machines, and it consists in certain improvements in the means for operatively connecting said clutches, as will be hereinafter fully set forth and pointed out in the claim.

In the accompanying drawings: Figure 1 is a vertical longitudinal sectional view showing two clutches of substantially the construction shown in Letters Patent of the United States, No. 461,929, dated October 27, 1891, connected together by my improved coupling mechanism. Fig. 2 is an elevation of the link, E, and lever, D, looking in the direction of the arrow in Fig. 1.

My invention is not necessarily limited to use upon the particular type of friction clutch here shown as it may be applied to the various types of clutches, wherein the operating levers are moved radially from and toward the shaft.

In the accompanying drawings, letters of reference indicate parts as follows: A, A'; the pulleys; B, B', the clutch rings carried by the pulleys; C, C', the clutch rings carried by the shaft; D, D', the operating levers of the clutches; E, E', the links that connect the levers, D, D', with the shifting sleeve; and F, the shifting sleeve.

My improvement consists particularly in the means herein shown whereby the shifting sleeve, F, is so connected with the levers, D and D', that the sleeve, throughout part of its movement, will not act upon said levers, and so that it may be held at a central intermediate position and thereby leave both clutches disengaged.

Where two contiguous pulleys on a common shaft are provided with clutches harnessed together, as illustrated, it is either for the purpose of reversing or for changing speed or both, as for example, in the drawings the pulleys, A and A', are of different diameters, hence the belts thereon will run at different speeds, and if one of said belts is crossed, the shaft propelled by it will run in a reverse direction from the shaft which propels said belt. Now it is desirable in rigs of this kind that the shifting device may be held at a neutral intermediate point, and thus throw both clutches out of engagement, and thereby cause a stoppage.

Where the shifter is a double cone, as is sometimes the case, the above effect is secured by simply allowing sufficient space to allow the cone to clear both sets of clutch levers, but where the shifter is connected with the clutch levers by links, as is often desirable, it is necessary to provide special means for permitting the shifter to occupy a neutral point; and such special means are here shown and constitute my invention.

It is not necessary to an understanding of my invention that the mechanism of the clutches here shown be fully explained, as it forms no part of the same.

In the clutches here shown, and in many other types of this class of clutches, the clutch is engaged and disengaged by a radial movement of the clutch actuating levers, which are actuated by the links, E and E', which connect it with the shifter, F, said links being pivoted to said levers at $d$.

The details of my improved construction are as follows: The links, E and E', which connect the levers with the shifter are made with a slot, $e$, so as to allow for free movement and the link at the slotted end is made thicker than at the other end, thus forming a shoulder, $e'$. The levers, D and D', are formed with a groove, $d'$, to allow the link to move in upon the lever, and the bottom of the groove forms a shoulder, $d^2$, along the bifurcated part of the lever.

In Fig. 1, the link, E, is shown in its vertical position, and the link, E', in its horizontal position, and Fig. 2 shows the link, E, as viewed from the arrow. Now it will be seen that as the shifter, F, is moved toward the right of Fig. 1, the link, E, acting by its shoulder, $e'$, upon the shoulder $d^2$, on the lever, will draw the lever down and disengage the clutch rings, B, C, and the link, E', will move in parallelism on the lever, D', until the pivot, $d$, reaches the end of the slot, $e$. When the parts have reached this position, both the clutch devices will be disengaged. This is what I have referred to as the neutral point. A further movement of the shifter to the right will cause the link, F', to lift the lever, D', and engage the clutch rings, B' C', and the link, E, will move in parallelism with the lever, D. It will therefore be seen that the links, when lifting the levers, act with the end of the slot, $e$, against the pivot pin, $d$, and when pulling down the levers they act with the shoulders, $e'$, upon the shoulders, $d^2$. It will also be seen that as the shifter starts to move from one extreme position toward the other, the clutch from which it is moving is immediately disengaged, and the clutch toward which it is moving is not actuated into engagement until the said shifter is approaching its limit of movement in that direction, and that if said shifter is stopped at the intermediate point, both of the clutches will be disengaged.

What I claim as new is—

In mechanism for coupling friction clutches, the combination with the shifting sleeve between the clutches and the operating levers of the clutches, of slotted links connecting said shifting sleeve with said operating levers, and engaging shoulders on said levers and links, substantially as and for the purposes set forth.

In testimony whereof I affix my signature in presence of two witnesses.

EDWARD L. JONES.

Witnesses:
WM. P. HAYES,
D. W. JULL.